(12) United States Patent
Wu

(10) Patent No.: US 8,117,628 B2
(45) Date of Patent: *Feb. 14, 2012

(54) APPARATUS OF DYNAMIC ANTI-VIBRATION FOR STORAGE DEVICE

(75) Inventor: Min-Der Wu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 637 days.

This patent is subject to a terminal disclaimer.

(21) Appl. No.: 12/325,058

(22) Filed: Nov. 28, 2008

(65) Prior Publication Data

US 2009/0138900 A1 May 28, 2009

(30) Foreign Application Priority Data

Dec. 29, 2005 (TW) ................................ 94147341 A

(51) Int. Cl.
 *G11B 33/14* (2006.01)
(52) U.S. Cl. .................. 720/651; 720/692; 360/97.02; 361/679.34
(58) Field of Classification Search ............... 360/97.02, 360/97.03; 720/692–694, 688, 691, 651; 361/679.34, 679.35, 679.36
See application file for complete search history.

(56) References Cited

U.S. PATENT DOCUMENTS

| 5,445,249 | A | | 8/1995 | Aida et al. | |
|---|---|---|---|---|---|
| 5,555,061 | A | * | 9/1996 | Soshi et al. | 396/53 |
| 5,631,427 | A | * | 5/1997 | Bridges | 73/658 |
| 6,021,041 | A | * | 2/2000 | Genix et al. | 361/679.34 |
| 6,169,718 | B1 | * | 1/2001 | Matusi | 720/657 |
| 6,178,156 | B1 | | 1/2001 | Kuwajima et al. | |
| 6,646,977 | B2 | * | 11/2003 | Chen et al. | 720/692 |
| 6,690,638 | B1 | | 2/2004 | Kiyomiya et al. | |
| 6,834,393 | B2 | | 12/2004 | Akimaru et al. | |
| 6,859,933 | B2 | | 2/2005 | Park et al. | |
| 6,883,175 | B2 | | 4/2005 | Liao et al. | |
| 7,472,407 | B2 | * | 12/2008 | Takita et al. | 720/692 |
| 7,543,314 | B2 | * | 6/2009 | Park et al. | 720/692 |
| 7,886,317 | B2 | * | 2/2011 | Chang et al. | 720/651 |
| 2006/0130084 | A1 | | 6/2006 | Chiu | |
| 2006/0242659 | A1 | | 10/2006 | Shimada et al. | |

(Continued)

FOREIGN PATENT DOCUMENTS

CN 200517600 6/2005

(Continued)

OTHER PUBLICATIONS

Taiwan Patent Office, Office Action mailed Nov. 17, 2010 in application No. 094147341 which corresponds to the present application.

(Continued)

*Primary Examiner* — Brian Miller
(74) *Attorney, Agent, or Firm* — Workman Nydegger

(57) ABSTRACT

An apparatus of dynamic anti-vibration for a storage device to support a storage device in a housing is provided. The apparatus includes a base board for holding the storage device, a plurality of damping elements coupled to the base board and the housing which have damping characteristics to dissipate kinetic energy and reduce the vibration of the base board, and at least one actuator coupled to the base board and the housing. The actuator electrically connected to the control unit is driven by the control unit, so as to generate a force to neutralize the vibration of the base board.

13 Claims, 5 Drawing Sheets

U.S. PATENT DOCUMENTS

2007/0130577 A1 6/2007 Chang et al.
2008/0034383 A1 2/2008 Harwin et al.

FOREIGN PATENT DOCUMENTS

| KR | 20040077059 | 9/2004 |
| TW | 538236 | 6/2003 |
| TW | 538239 | 6/2003 |
| TW | I234333 | 6/2005 |

OTHER PUBLICATIONS

Taiwanese IPO; Office Action in foreign application (TW 094147341) to which priority is claimed by the present application; May 8, 2008.

* cited by examiner

APPARATUS OF DYNAMIC ANTI-VIBRATION FOR STORAGE DEVICE

BACKGROUND OF THE INVENTION

1. Field of Invention

The present invention relates to an apparatus of dynamic anti-vibration for a storage device, and more particularly, to an apparatus of dynamic anti-vibration for a storage device that actively generates a force to neutralize the vibration.

2. Related Art

With the increase of data capacity, data density is becoming higher and higher, and the reading device of the storage medium is getting more and more precise.

Take the optical drive as an example; the increase of data density has shortened the distance between the optical pickup head and the surface of an optical disk. Vibrations caused either by the unevenness of the optical disk itself during the rotation or by collision from an external force may lead to the shift of the optical pickup head, and thus the optical pickup head cannot be precisely focused on a data track that is predetermined to be read, and may even collide with the optical disk. And in a hard disk drive, the magnetic head of the hard disk drive also has the same problem, that is, it is easily collided because of vibration, and meanwhile, with the increase of the rotation speed of the disk, vibration of the hard disk drive itself further aggravates the problem.

Therefore, many anti-vibration designs have been provided. For example, in U.S. Pat. Nos. 6,883,175, 6,834,393, and 6,690,638, damping elements made of rubber materials are placed between the base board of the optical pickup head and the housing of the optical drive so as to absorb kinetic energy to dissipate the vibration. However, the design using damping elements to passively absorb or isolate the vibration is limited by the characteristics of the materials, and thus cannot completely absorb all vibration. In case that amplitude is too large or frequency is too low, the damping elements are not capable of effectively absorbing or isolating the vibrations. Moreover, nowadays, designs for both optical drives and hard disk drives tend to be of higher rotation speeds, and the frequency of eccentric vibration caused by the spindle motor is increased, rendering the effect of vibration absorption or isolation through the damping elements unsatisfactory.

SUMMARY OF THE INVENTION

Accordingly, an object of the present invention is to provide a dynamic anti-vibration apparatus for a storage device, so as to solve the problem of poor performance in conventional passive vibration absorption and isolation devices.

To achieve the aforementioned object, the present invention provides a dynamic anti-vibration apparatus for a storage device to support the storage device in a housing, wherein, the storage device can be an optical pickup device of an optical drive or a hard disk drive. The anti-vibration apparatus includes a base board, a plurality of damping elements, at least one actuator and a control unit.

The efficacy of the present invention is to actively generate a force through an actuator to neutralize the vibration, which enhances the effect of vibration absorption and isolation and improves overall anti-vibration performance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

To better understand the object, structure, features and functions of the present invention, the embodiments are described below in detail.

Figure 1:
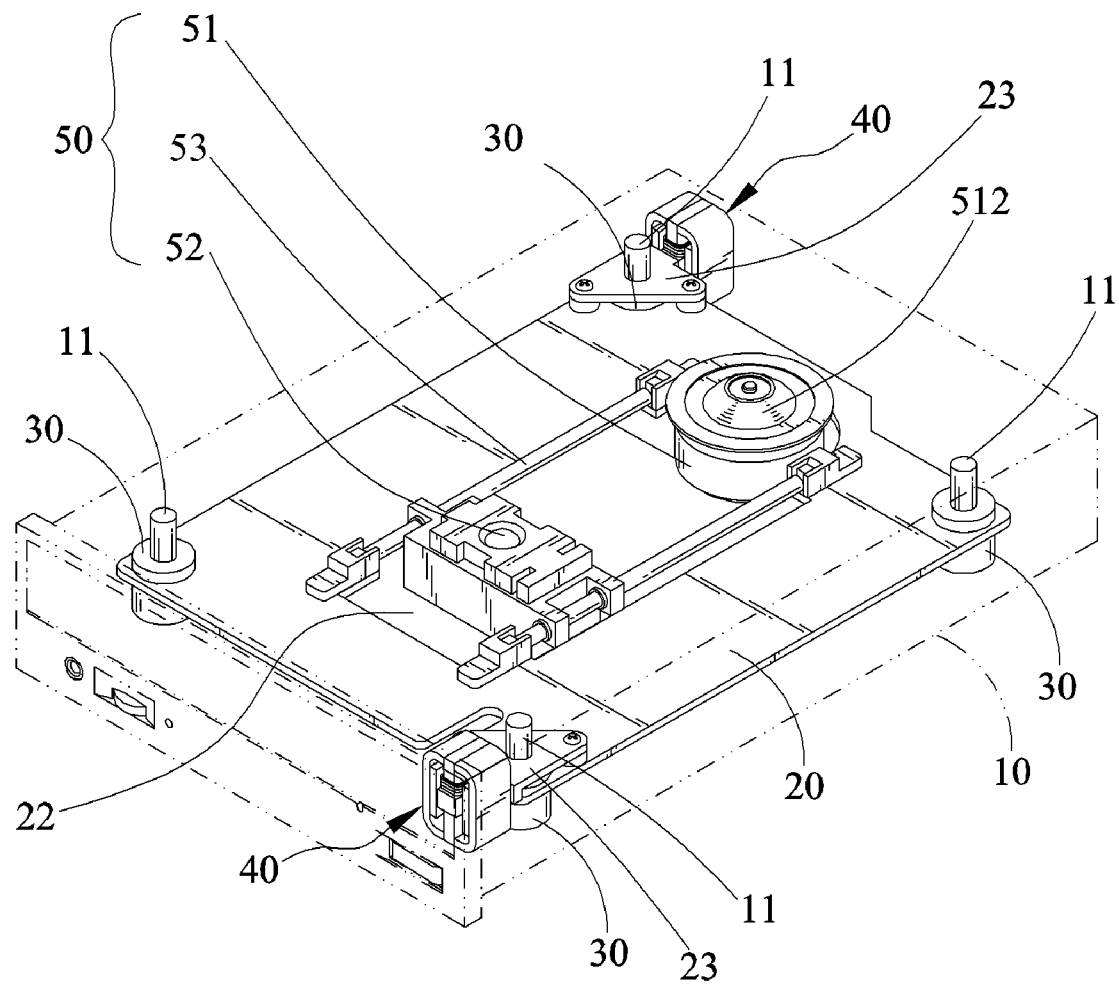
FIG. 1 is a perspective view of a first embodiment of the present invention.
Figure 2:
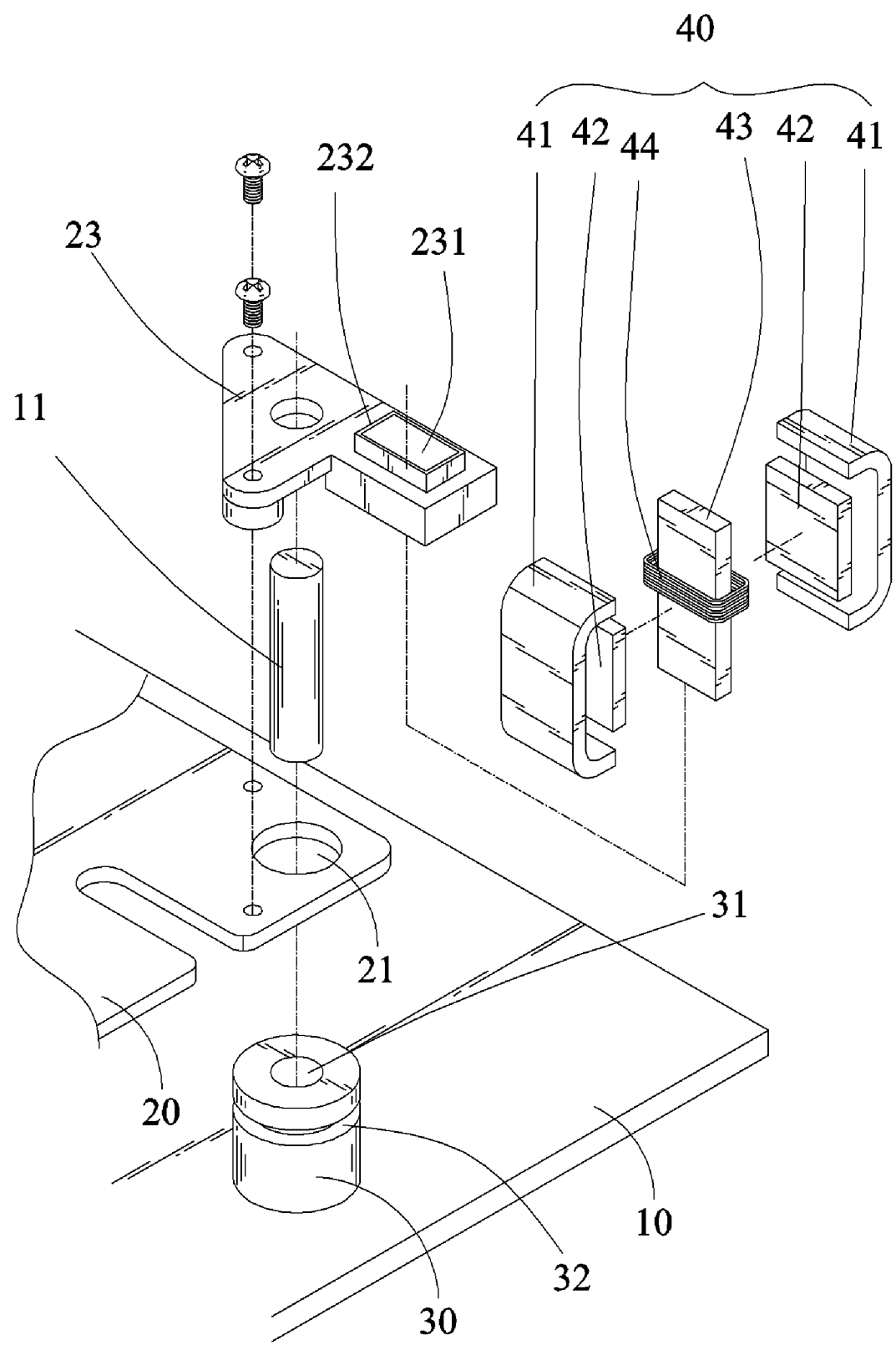
FIG. 2 is a partial exploded view of the first embodiment.
Figure 5:
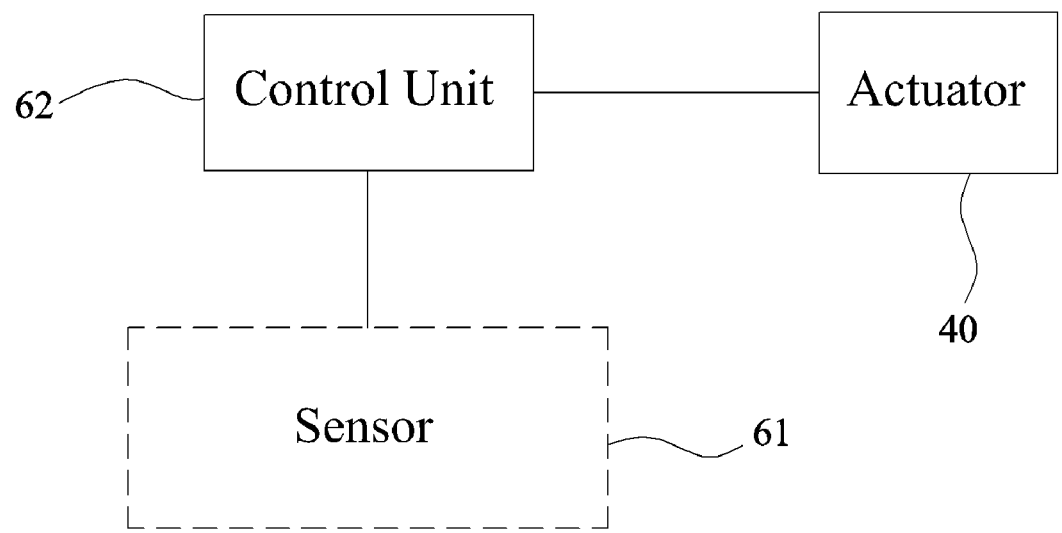
FIG. 5 is a systematic block diagram of the first embodiment.

FIGS. 1 and 2 show a dynamic anti-vibration apparatus for a storage device according to one embodiment of the invention, which is used to support a storage device 50 in a housing 10 and includes a base board 20, a plurality of damping elements 30, one or more actuators 40 and a control unit 62 (shown in FIG. 5).

The base board 20 is used to hold the storage device 50, and a plurality of through holes 21 are set in corners of the base board 20 to let a plurality of columns 11 through, and one end of each of the columns 11 is fixed to the inner side of the housing 10. In this embodiment, the storage device 50 is an optical pickup module or an in-car optical drive, comprising: a spindle motor 51 fixed to the bottom side of the base board 20, for driving a rotating spindle 512 protruded from the top side of the base board 20; an optical pickup head 52 for projecting a laser beam for reading and writing on the read/write surface of an optical disk; a transmission component 53 for causing the optical pickup head 52 to reciprocate within a groove 22 in the base board 20, wherein the rotating spindle 512 is used to support the optical disk and cause it to rotate, and the transmission component 53 is used to cause the optical pickup head 52 to reciprocate within the groove 22 in the base board 20, such that the laser beam may be focused on a data track that is predetermined to be read.

The plurality of damping elements 30 is made of a rubber material and has damping characteristics. Each of the damping elements 30 has a dowel bore 31 throughout, and has a trench 32 surrounding the periphery on the outer surface thereof. The damping element 30 is placed between the base board 20 and the housing 10, and each of the columns 11 passes through the dowel bore 31 of the damping element 30. The trench 32 matches with the through hole 21 of the base board 20, such that the edge of the through hole 21 is fit in the trench 32. Thus, the base board 20 and the housing 10 are coupled, and the damping characteristics of the damping elements 30 are used to dissipate the kinetic energy generated by the vibration of the base board 20 to absorb the vibration of the base board 20.

The damping elements 30 passively absorb and dissipate the kinetic energy of the vibration, while the actuator 40 electrically connected to the control unit 62 is driven by the control unit 62, so as to actively generate a force with the same frequency and the opposite direction to the vibration to directly interfere and thus neutralize the vibration.

Figure 3:
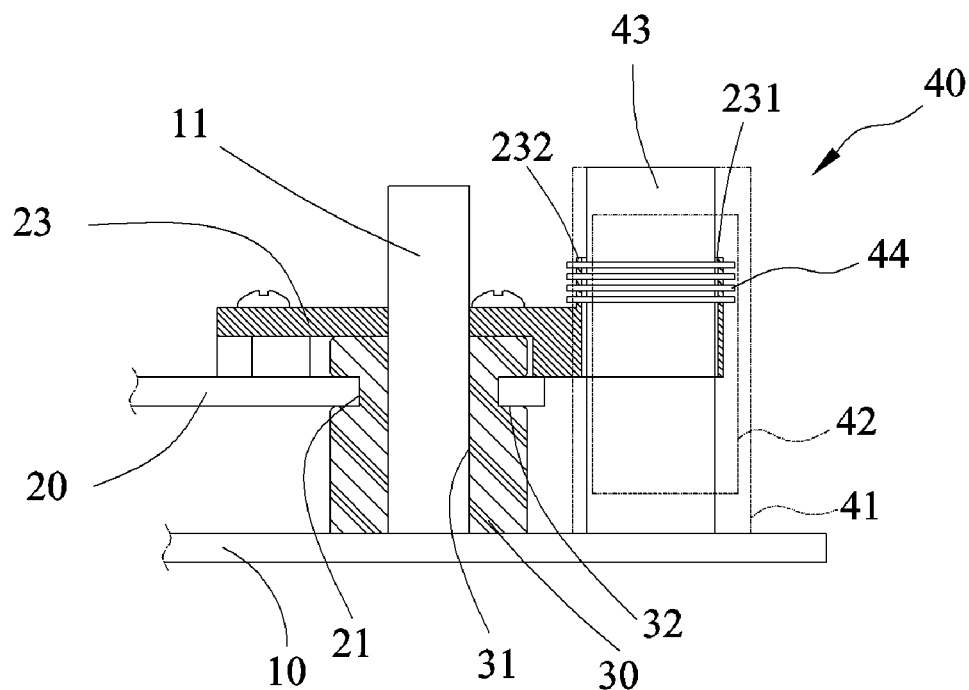
FIG. 3 is a partial sectional view of the first embodiment.
Figure 4:
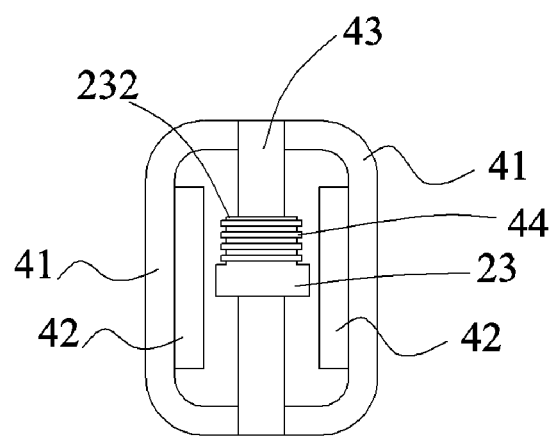
FIG. 4 is a side view of the actuator of the first embodiment.

Referring to FIGS. 3 and 4 together with FIG. 2, the actuator 40 is disposed on the housing 10, and is connected to a side edge of the base board 20. Moreover, the storage device 50 further includes the control unit 62 disposed thereon. The actuators 40 are electrically connected to the control unit 62 to be controlled by the control unit 62. When the base board 20 is vibrated, the actuator 40 is driven by the control unit 62 to generate a force to neutralize the vibration of the base board 20.

In this embodiment, the actuator 40 is a voice coil motor. The voice coil motor includes a pair of yokes 41, a pair of permanent magnets 42, a magnetically permeable element 43 and a coil 44, wherein the yokes 41 are set on the housing 10, the two permanent magnets 42 are fixed on two sides of the two yokes 41 that face one another, and the magnetically permeable element 43 is also fixed to the housing 10 between the two permanent magnets 42. The coil 44 is wound about the magnetically permeable element 43, and is located on two sides of the two permanent magnets 42 that face one another, i.e. the coil 44 is located between the two permanent magnets 42 and the magnetically permeable element 43, such that the permanent magnets 42, the magnetically permeable element 43 and the yokes 41 form two pairs of closed loops of magnetic line of force which are perpendicular to the direction of a current in the coil 44.

A connection board 23 is further arranged on the base board 20. One end of the connection board 23 is fixed to the base board 20, and the other end forms a dowel bore 231 and extends towards the actuator 40, and an annular rib 232 is formed on the edge of the dowel bore 231, wherein the magnetically permeable element 43 may pass through the dowel bore 231, and then the coil 44 is fixed to the annular rib 232, such that the coil 44 is combined to the connection board 23 so as to combine the base board 20 and the coil 44. When a current is supplied to the coil 44, the amount and direction of the current interact with the permanent magnets 42, and the amount and direction of the magnetic force generated by the coil 44 can be determined according to Fleming's left hand rule, and the columns 11 guide the coil 44 to reciprocate along a straight line, such that the force generated by the coil 44 actuates the base board 20, thus neutralizing the vibration of the base board 20.

FIG. 5 is a systematic block diagram of the first embodiment of the present invention. The storage device 50 further includes a sensor 61 disposed thereon according to the demand. The sensor 61 is electrically connected to the control unit 62. The amount, phase, and frequency of the force generated by the coil 44 are changed in accordance with the vibration state of the storage device 50. The sensor 61 is set on the storage device 50 or the base board 20 to measure the vibration state of the storage device 50 or the base board 20. The sensor 61 can be an acceleration sensor, velocity sensor, a displacement sensor, angular displacement sensor, angular velocity sensor, angular acceleration sensor, force sensor, or torque sensor according to the demand. Then, the measured result is transmitted to a control unit 62, it is calculated together with the influence caused by the damping elements 30. Then a current of an appropriate size and direction is sent to the actuator 40, such that the actuator 40 generates a force with the same frequency, the opposite phase and of an amount that will just neutralize the vibration. Thus, the vibration is further eliminated to reduce the impact of the vibration on the storage device 50, such that the optical pickup head 52 can be precisely focused on the correct data track, and will not over shift due to the vibration.

Figure 6:
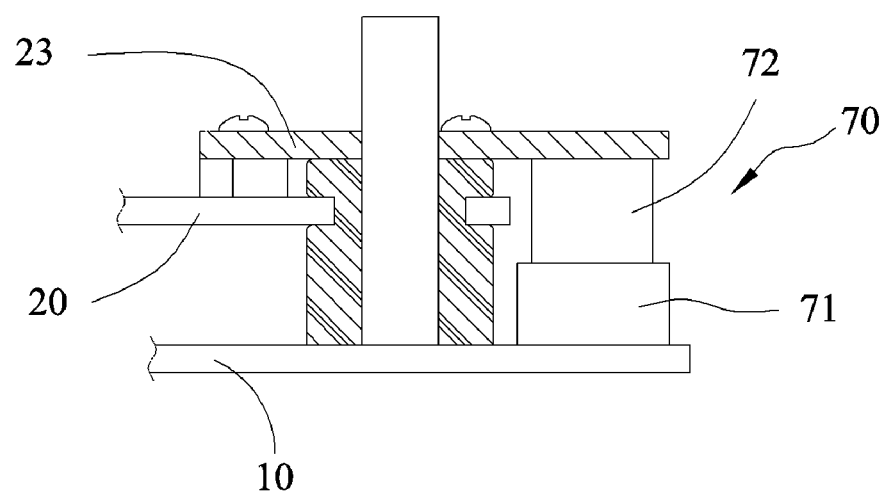
FIG. 6 is a partial sectional view of a second embodiment of the present invention.

FIG. 6 shows a dynamic anti-vibration apparatus for a storage device provided in a second embodiment of the present invention, wherein the actuator 70 is a piezoelectric element which has a base 71 and an actuating portion 72, wherein the base 71 is disposed on the housing 10, and the actuating portion 72 is disposed on the base 71 and is connected to the connection board 23 of the base board 20. The actuating portion 72 is made from a piezoelectric material, and deforms when a voltage is received, such that the force is generated to the base board 20 to eliminate the vibration.

Figure 7:
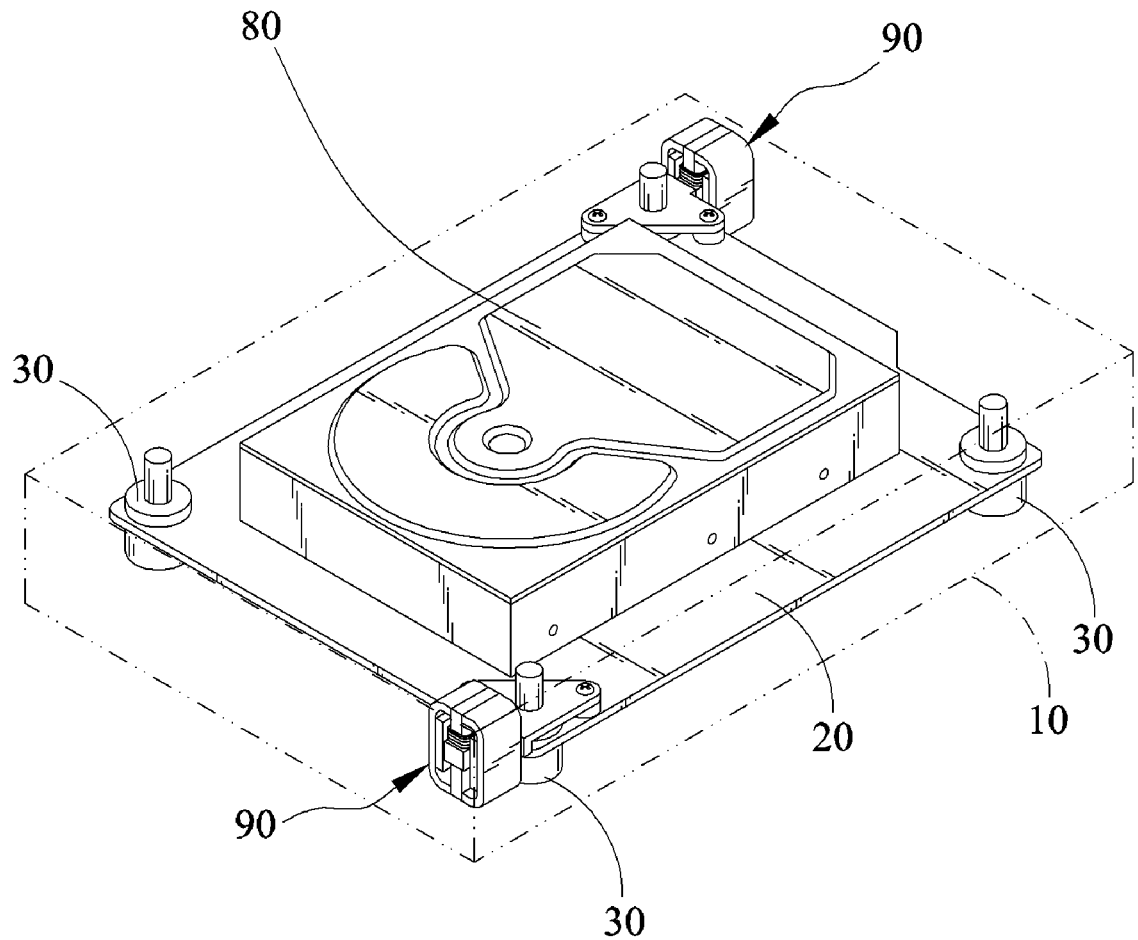
FIG. 7 is a perspective view of a third embodiment of the present invention.

FIG. 7 shows a dynamic anti-vibration apparatus for a storage device disclosed in a third embodiment of the present invention, wherein a storage device 80 is a hard disk drive fixed on the base board 20, and damping elements 30 and an actuator 90 are disposed between the base board 20 and the housing 10, such that the vibration of the base board 20 and the storage device 80 is absorbed with the damping elements 30, and is simultaneously neutralized by a force actively generated by the actuator 90.

From the above-mentioned embodiments of the present invention, a force is actively generated through an actuator to neutralize the vibration, which enhances the effect of vibration absorption and isolation; therefore, overall anti-vibration performance is achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus of dynamic anti-vibration for a storage device, for supporting the storage device in a housing, comprising: a base board, for holding the storage device;
    a plurality of damping elements, coupled to the base board and the housing, wherein each of the damping element dissipates kinetic energy generated by the vibration of the base board with the damping characteristic, so as to absorb the vibration of the base board;
    a control unit, disposed on the storage device;
    at least one actuator, coupled to the base board and the housing, the actuator electrically connected to the control unit to be controlled by the control unit, the actuator driven by the control unit for generating a force to neutralize the vibration of the base board; and
    a sensor, disposed on the storage device, wherein the sensor is electrically connected to the control unit to measure the amplitude and the direction of the vibration of the storage device, so as to transmit a result to the control unit, such that the actuator is driven by the control unit, thereby neutralizing the vibration by the force generated by the actuator.

2. The apparatus of dynamic anti-vibration for a storage device as claimed in claim 1, the sensor is selected from a group consisting of acceleration sensor, velocity sensor, a displacement sensor, angular displacement sensor, angular velocity sensor, angular acceleration sensor, force sensor, and torque sensor.

3. The apparatus of dynamic anti-vibration for a storage device as claimed in claim 1, wherein the storage device is an optical pickup module, including an optical pickup head, a rotating spindle, and a transmission component, and the rotating spindle is used to support an optical disk and cause the optical disk to rotate, and the transmission component is used to cause the optical pickup head to reciprocate on the base board to read from and write on the optical disk.

4. The apparatus of dynamic anti-vibration for a storage device as claimed in claim 1, wherein the storage device is an in-car optical drive.

5. The apparatus of dynamic anti-vibration for a storage device as claimed in claim 1, wherein the storage device is a hard disk drive.

6. The apparatus of dynamic anti-vibration for a storage device as claimed in claim 1, wherein the actuator is a voice coil motor.

7. The apparatus of dynamic anti-vibration for a storage device as claimed in claim 6, wherein the voice coil motor comprises:
   a yoke disposed on the housing;
   a permanent magnet disposed on one side of the yoke;
   a magnetically permeable element disposed on the housing and forming a closed loop of magnetic line of force with the yoke and the permanent magnet; and
   a coil surrounding the magnetically permeable element, disposed on one side of the permanent magnet, and connected to the base board, wherein when a current is supplied to the coil, the amount and direction of the current determines the amount and direction of a magnetic force generated by the coil, such that the coil interacts with the permanent magnet to generate the force to eliminate the vibration of the base board.

8. The apparatus of dynamic anti-vibration for a storage device as claimed in claim 7, further comprising a connection board connected to the base board, wherein the coil is combined to one end of the connection board.

9. The apparatus of dynamic anti-vibration for a storage device as claimed in claim 8, wherein a dowel bore is formed in one end of the connection board, and the magnetically permeable element passes through the dowel bore.

10. The apparatus of dynamic anti-vibration for a storage device as claimed in claim 9, wherein an annular rib is formed on an edge of the dowel bore, and the coil is fixed to the annular rib.

11. The apparatus of dynamic anti-vibration for a storage device as claimed in claim 6, wherein the voice coil motor has two yokes and two permanent magnets, the two permanent magnets are respectively placed on two sides of the two yokes that face one another, and the coil is located between the two permanent magnets.

12. The apparatus of dynamic anti-vibration for a storage device as claimed in claim 1, wherein the actuator is a piezoelectric element including a base and an actuating portion, with the base disposed in the housing and the actuating portion disposed on the base and connected to the base board, and wherein the actuating portion is made of a piezoelectric material and deforms when receiving a voltage to generate the force to the base board to neutralize the vibration.

13. The apparatus of dynamic anti-vibration for a storage device as claimed in claim 12, wherein a connection board is fixed on the base board, and the connection board extends to and combines with the piezoelectric element.

* * * * *

UNITED STATES PATENT AND TRADEMARK OFFICE
CERTIFICATE OF CORRECTION

PATENT NO.        : 8,117,628 B2
APPLICATION NO.   : 12/325058
DATED             : February 14, 2012
INVENTOR(S)       : Min-Der Wu et al.

Page 1 of 1

It is certified that error appears in the above-identified patent and that said Letters Patent is hereby corrected as shown below:

On the Title Page: please add the following paragraph:

Item (63) Related U.S. Application Data
Continuation-in-part of application No. 11/422,829, filed on June 7, 2006, now Pat. No. 7,538,974.

Signed and Sealed this
Fifth Day of March, 2013

Teresa Stanek Rea
*Acting Director of the United States Patent and Trademark Office*